United States Patent Office 2,812,371
Patented Nov. 5, 1957

2,812,371

HEAT BODYING POLYDIOLEFINIC DRYING OILS WITH DICYCLOPENTADIENE

Arthur Donald Green, Cranford, N. J., assignor to Esso Research and Engineering Company, a corporation of Delaware No Drawing. Application May 1, 1952, Serial No. 285,557

10 Claims. (Cl. 260—666)

This invention relates to enamels which use an oily polymer of butadiene as vehicle and more particularly to an improvement obtained by treatment of the polymeric vehicle with a small amount of cylopentadiene or its lower polymer.

Synthetic drying oils can be prepared by various methods by the polymerization of diolefins. Sodium polymerization, emulsion polymerization, as well as bulk polymerization in the presence of a diluent and a peroxide type catalyst have been used for this purpose with varying degrees of success. However, among the difficulties encountered with various synthetic drying oils were poor drying rate, poor flexibility, poor adhesion of air-dried coatings, poor wetting properties and consequent difficulty of grinding in pigments, poor gloss and streakiness of brushed enamel films. Many of these disadvantages have been overcome in the past by copolymerizing the butadiene with styrene, using sodium as the catalyst. However, for economical reasons it has been desirable to substitute other materials for the more expensive styrene or its homologs. Up to now this has been impossible to accomplish. However, it has now been discovered that films having the desirable properties of those prepared from butadiene and styrene can be prepared by first polymerizing a conjugated diolefin with sodium in the usual manner and then reacting the resulting oil with a cylodiolefin such as cyclopentadiene or its dimer and homologs such as methylcyclopentadiene or its dimer. If desired, a copolymer of the diolefin and styrene can first be prepared and the copolymer then reacted with the cyclopentadiene.

It has also been previously proposed to prepare copolymers of a diene hydrocarbon such as cyclopentadiene or its dimer and an unsaturated glyceride oil, such as linseed oil or soya bean oil, to improve the film resistance to chemicals. Such an improvement would be expected because of the decrease in the oxygen content of the copolymers over the original vegetable oil. However, in connection with the reaction of polybutadiene drying oil with cyclopentadiene or its dimer, there is no basis for expecting an improvement in film resistance since both components are hydrocarbons. In fact, the products of this invention are unique in exhibiting properties which make them suitable for surface coatings since phenolic and modified phenolic resins do not react at elevated temperatures with polybutadiene oil to give products suitable for use in surface coatings.

The synthetic oils useful for reacting with the cyclopentadiene or its dimer in accordance with the present invention are oily polymers of butadiene, isoprene, dimethyl butadiene, piperylene, methyl pentadiene or other conjugated diolefins having four to six carbon atoms per molecule with 0 to 40 parts of styrene.

The polymerization is carried out at 20 to 100° C., preferably between 40 and 85° C., in a reaction diluent. As a polymerization catalyst, about 1.2 to 10 parts, preferably about 1.5 to 3 parts, of a finely dispersed metallic sodium catalyst is used in the optional presence of various polymerization modifiers which tend to effect a more uniform reaction and produce colorless products of more exactly reproducible drying rates. As reaction diluent, it is desirable to use, for example, a naphtha having a boiling range between about 90 and 120° C. or straight run mineral spirits such as Varsol (boiling range 150 to 200° C.), inert hydrocarbon diluents boiling between —15° C. and 200° C. such as butane, xylene, benzene, toluene, cyclohexane or the like, individually or in admixture with each other. The diluents are usually used in amounts ranging from 50 to 500, preferably 150 to 300 parts per 100 parts of monomers.

Instead of using inert diluents, it is also possible to use modifying diluents such as butene-2 or other low boiling olefins which modify the reaction by limited copolymerization and chain termination. Various ethers having more than two carbon atoms per molecule such as diethyl ether, diisopropyl ether, dioxane, vinyl ethyl ether, vinyl isobutyl ether, anisole and phenetole are also useful as diluents and are particularly helpful as co-diluents to insure formation of colorless products when used in amounts ranging from about 10 to 35 parts per 100 parts of monomers, together with the aforesaid amount of inert diluent such as solvent naphtha; p-dioxane is particularly preferred. Other means of modifying the properties of the polymer product involve the substitution of all or at least part of the butadiene feed with other diolefins such as isoprene, piperylene, 2,3-dimethyl butadiene-1,3 or 2-methyl pentadiene-1,3, as well as with up to 40% by weight of styrene as described above.

Especially where a coarse dispersion of sodium is used as catalyst, it is also advantageous to use about 1 to 50 weight percent, prefereably 10 to 20% based on sodium of a $C_1$ to $C_5$ aliphatic alcohol. Secondary and tertiary alcohols, particularly isopropanol or tertiary butanols, are preferred. Such alcohols act as polymerization promoters and, depending on the degree of catalyst dispersion, have a more or less pronounced effect on the intrinsic viscosity of the resulting product. The reaction time and induction period also vary depending on the degree of catalyst dispersion and reaction temperature, the reaction time ranging from about 40 hours with a coarse catalyst at about 50° C. to about 15 minutes at about 90° C. with a catalyst particle size of less than 100 microns diameter. While sodium is preferred, similar catalysts such as potassium, sodium hydride, various alloys of sodium, or the "Alfin" type catalyst comprising a complex of a metallated olefin and sodium alcoholate are also useful, but not nearly as effective. Agitation of the reaction mixture during synthesis increases the efficiency of the catalyst. Conversions of 50 to 100% on monomers can be accomplished fairly readily in batch-type as well as in continuous polymerizations, although the catalyst requirements are twice or three times greater for continuous operation than for a batch operation of equal conversion.

Destruction of catalyst at the end of the reaction is effectively accomplished by adding to the reactor a moderate excess of acetic acid, e. g. 100% excess of acid based on sodium, and agitating at the reaction temperatures for another half hour or so. After destruction of the residual sodium by acid, the crude product containing the acetate, excess acid and other solid impurities is cooled, neutralized with an excess of anhydrous ammonia and then filtered with a filter aid such as silica gel, clay, charcoal, glass fibers or its equivalent.

In the preferred modification, the clear, colorless filtrate is then fractionally distilled to remove the dioxane-hydrocarbon azeotropes. Finally, if the polymerization is carried out in a relatively large amount of hydrocarbon diluent so that the resulting polymer solution is too dilute for use as a varnish or enamel base, it is desirable to distill off additional hydrocarbon until a product containing about 50% non-volatile matter is obtained, the non-volatile matter being the polymeric drying oil. The resulting product, being a solution of polymer drying oil in a suitable hydrocarbon solvent such as solvent naphtha or mineral spirits is a clear, colorless varnish composition having a viscosity between about 0.5 and 25 poises, preferably 1 to 10 poises, at 50% non-volatile matter. This corresponds to an intrinsic viscosity of about 0.10 to 0.4. If desired, the product viscosity can be readily increased within or above these limits by heat bodying at temperatures between 200 and 300° C., e. g. at 220 to 260° C. Such clear varnish compositions can be brushed, poured or sprayed, and give good clear films on drying in air or baking, especially when conventional driers such as the naphthenates or octoates of cobalt, lead or manganese are added thereto.

The present invention is based upon the discovery that the dried films of the synthetic drying oils prepared as described above can be materially improved by reacting the drying oil with 5 to 40 parts, preferably 20 to 25 parts of a cyclodiolefin or its dimer at temperatures between 200° and 300° C. for from 1 to 3 hours. To increase the pigment wetting properties of the final oil, it may be reacted with up to 2.5% by weight of maleic anhydride as described in application Serial No. 102,703, filed July 1, 1949, now U. S. Patent No. 2,652,342, either before or after its reaction with the cyclodiolefin.

The subsequent examples are presented to illustrate the advantages of oils treated in accordance with the present invention as opposed to untreated oils. All quantities expressed herein and elsewhere in the specification as "parts" refer to parts by weight.

Example 1

A butadiene drying oil was prepared from the following charge:

| | Parts |
|---|---|
| Butadiene-1,3 | 100 |
| Varsol [1] | 200 |
| Dioxane | 40 |
| Isopropanol | 0.2 |
| Sodium [2] | 1.5 |

[1] Straight run mineral spirits; A. P. I. gravity, 49.0; flash, 105° F.; boiling range, 150° to 200° C.; solvent power, 33–37 kauri-butanol value (reference scale: benzene—100 K. B. value, n-heptane 25.4 K. B. value).
[2] Dispersed to a particle size of 10 to 50 microns by means of an Eppenbach homo-mixer.

18 g. dicyclopentadiene were added to 160 g. of the drying oil prepared as described above (50% N. V. M. and 1.0 poise viscosity) and the mixture heated for 1.5 hours at 250° C. On cooling to room temperature, a clear oil was obtained having a viscosity of 10 poises at 50% N. V. M. The synthetic oil alone would have had a viscosity of 3.0 poises for the same period of heating.

A comparison of chemical resistances of one-week old films and flexibilities at one, four, and six weeks of synthetic oils bodied to a 10 poise viscosity with and without dicyclopentadiene (22.5%) present are given below:

| Bodied Oil | Chem. Res. (1 week) | | | | Flexibility [b] | | |
|---|---|---|---|---|---|---|---|
| | W [a] | G [a] | S [a] | C [a] | 1 week | 4 weeks | 6 weeks |
| Polybutadiene without DCP | 3 | 0 | 2 | 1 | 5 | 5 | 5 |
| Polybutadiene with DCP | 1 | 0 | 0 | 0 | 0 | 0 | 5 |

[a] Water, soap, grease, and caustic resistance: 0—unaffected, 1-3—discolored or whitened and less adhesion, 4-6—softened and loss in adhesion, 7-9—pin-holed or blistered to failure by removal of the film.
[b] Flexibility (180° bend test): 0—unaffected, 1-4—hazed and less adhesion, 5-6—very fine cracking, 7-9—heavy cracking and peeling.

Both oils dried dust-free in four hours.

The nature of the present invention having been thus fully set forth and specific examples of the same given, what is claimed as new and useful and desired to be secured by Letters Patent is:

1. A process for improving a synthetic conjugated diolefinic drying oil which comprises mixing said oil with a cyclodiolefin and heating the mixture at a temperature between 200° and 300° C.

2. A process for improving a synthetic polybutadiene drying oil which comprises mixing 100 parts of said oil with 5 to 40 parts of a hydrocarbon selected from the class consisting of cyclopentadiene and its dimer and methylcyclopentadiene and its dimer, and heating the mixture at a temperature between 200° and 300° C.

3. A process for improving a synthetic conjugated diolefinic drying oil which comprises mixing 100 parts of said oil with 5 to 40 parts of dicyclopentadiene and heating the mixture at 200° to 300° C.

4. In a process for improving a polymeric drying oil having a viscosity between .5 and 25 poises and prepared by polymerizing a conjugated diolefin in the presence of metallic sodium, the step which comprises adding to the oil 5 to 40 percent dicyclopentadiene and heating the resulting mixture at a temperature between 250° to 300° C.

5. In a process for improving a polymeric drying oil having a viscosity between .5 and 25 poises and prepared by mixing 100 parts of butadiene-1,3, 150 to 250 parts of straight run mineral spirits boiling between 150 and 250° C., 1.5 to 3 parts of finely dispersed metallic sodium and 10 to 25 parts of an ether having from 3 to 8 carbon atoms per molecule and heating the mixture at a temperature between 30 and 85° C., the improvement which comprises mixing the resulting polymeric drying oil with 20 to 25 parts of dicyclopentadiene and heating the resulting mixture at a temperature of 250° C.

6. A process for improving a drying oil prepared by copolymerizing butadiene with 0 to 40 parts by weight of styrene which comprises mixing 100 parts of said oil with 5 to 40 parts of dicyclopentadiene and heating the mixture at 200° to 300° C.

7. A drying oil having a viscosity between .5 and 25 poises and comprising a polymer of 70 to 90 parts of a $C_4$ to $C_6$ conjugated diolefin, and 5 to 40 parts of a hydrocarbon selected from the class consisting of cyclopentadiene and its dimer and methylcyclopentadiene and its dimer combined with said oil.

8. A drying oil having an intrinsic viscosity between 0.1 and .4 and comprising a polymer of 70 to 90 parts of a combined $C_4$ to $C_6$ conjugated diolefin, and 10 to 30 parts of cyclopentadiene combined therewith.

9. A drying oil having a viscosity between 0.5 and 25 poises and comprising 70 to 90% of an oily polybutadiene and 10 to 30% of cyclopentadiene and being dissolved in an inert hydrocarbon solvent boiling between 80° and 200° C.

10. A drying oil having a viscosity between 0.5 and 25 poises and comprising 70 to 90% of an oily copolymer of butadiene and styrene and 10 to 30% of cyclopentadiene and being dissolved in an inert hydrocarbon solvent boiling between 80° and 200° C.

References Cited in the file of this patent
UNITED STATES PATENTS

| 2,264,811 | Rothrock | Dec. 2, 1941 |
| 2,434,403 | Frey | Jan. 13, 1948 |
| 2,443,044 | Lycan et al. | June 8, 1948 |
| 2,611,788 | Bloch | Sept. 23, 1952 |
| 2,615,856 | Bloch | Oct. 28, 1952 |
| 2,650,209 | Nelson et al. | Aug. 25, 1953 |